A. S. WHITTEMORE.

Chimney.

No. 9,737. Reissued May 31, 1881.

Witnesses

R. K. Evans

G. E. Emerson

Inventor

A. S. Whittemore by A. H. Evans & Co

Attys

N. PETERS, Photo-Lithographer, Washington, D. C.

UNITED STATES PATENT OFFICE.

ALBERT S. WHITTEMORE, OF WILLIMANTIC, CONNECTICUT.

CHIMNEY.

SPECIFICATION forming part of Reissued Letters Patent No. 9,737, dated May 31, 1881.

Original No. 70,927, dated November 12, 1867. Application for reissue filed March 17, 1881.

*To all whom it may concern:*

Be it known that I, A. S. WHITTEMORE, of Willimantic, county of Windham, and State of Connecticut, have invented an Improvement in Combined Chimney and Ventilator; and I hereby declare the following to be a full, clear, and exact description thereof.

My invention consists of a chimney or flue with an extension protecting tube and ventilator constructed in such a manner that the compartments of a building may be thoroughly ventilated, and the chimney or flue at the same time rendered perfectly fire-proof.

Figure 1:
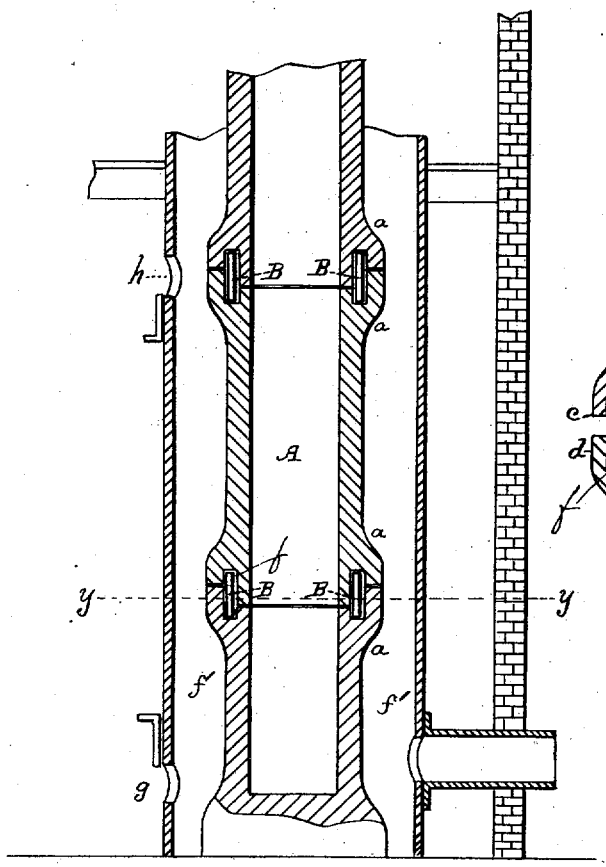
Figure 2:
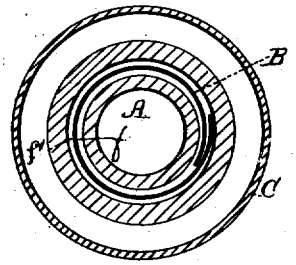

In the accompanying drawings, Figure 1 is a vertical central section of my invention. Fig. 2 is a horizontal section of the same, taken in the line *y y*, Fig. 1.

Figure 3:
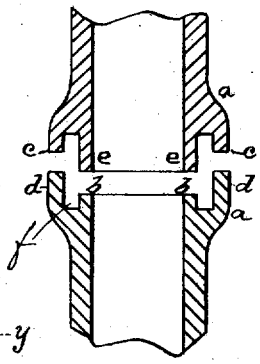

A represents a chimney or flue constructed of tiles of any suitable length—say two feet—and of a diameter corresponding to the size of the stove or furnace to which it is applied. These tiles are formed with flanges *a* at each end. These flanges are simply an enlargement of the exterior tiles to form abutting ends of considerable area. The ends of the tiles are provided with lapping joints formed by the interior and exterior flanges, *d e*, fitting one within the other, and resting against the faces *b c*, forming recesses *f*, as shown in Fig. 3. These flanges have annular recesses made in them, in which elastic circular metal bands B are fitted, the ends of the bands overlapping each other and expanding or contracting with the tiles, so as to insure tight joints at all times without being liable to fracture the ends of the tiles. This tile chimney or flue is encompassed by a pipe, C. Galvanized iron or zinc would probably be the best; but I do not wish to confine myself to the use of any particular material for the purpose. This pipe considerably exceeds in diameter the chimney or flue, so that a space, *f'*, is allowed between the flue and pipe for the passage of air, which is admitted into the lower end of the space *f* through a tube from the outer side of the building, and thus pure air may be let into any compartment through which the pipe and flue pass by having holes *g* made in the pipe, near the floor of the compartment, and vitiated air may be let into the pipe from the rooms through holes *h*, made in the outer pipe, near the ceiling of the compartment. This air-tube, it will be seen, renders the chimney or flue incapable of setting fire to any adjacent combustible material, as the latter cannot come in direct contact with the chimney or flue.

Having thus described my invention, what I claim as new, and desire to secure by Letters Patent, is—

1. A sectional tile or other chimney, in combination with a surrounding pipe of greater diameter than said chimney, whereby a continuous air-chamber is formed between the said pipe and chimney in their length through a building, for the purpose specified.

2. The tile-sections A, having their interlocking ends constructed to form the recess *f*, in combination with the bands B, inserted in said recesses *f*, for the purpose specified.

In witness whereof I have hereunto set my hand.

ALBERT S. WHITTEMORE.

Witnesses:
HUBER CLARK,
WARREN ATWOOD.